US011106971B2

(12) United States Patent
Lee

(10) Patent No.: US 11,106,971 B2
(45) Date of Patent: Aug. 31, 2021

(54) NEUROMORPHIC DEVICE AND A SYNAPSE NETWORK INCLUDING A POST-SYNAPTIC NEURON HAVING A SUBTRACTING CIRCUIT

(71) Applicant: SK hynix Inc., Icheon (KR)

(72) Inventor: Hyung-Dong Lee, Hwaseong (KR)

(73) Assignee: SK Hynix Inc., Icheon (KR)

( * ) Notice: Subject to any disclaimer, the term of this patent is extended or adjusted under 35 U.S.C. 154(b) by 969 days.

(21) Appl. No.: 15/805,001

(22) Filed: Nov. 6, 2017

(65) Prior Publication Data

US 2018/0300612 A1 Oct. 18, 2018

(30) Foreign Application Priority Data

Apr. 17, 2017 (KR) .................... 10-2017-0049285

(51) Int. Cl.
*G06N 3/063* (2006.01)
*G06N 3/04* (2006.01)
*G06N 3/08* (2006.01)

(52) U.S. Cl.
CPC ............ *G06N 3/063* (2013.01); *G06N 3/049* (2013.01); *G06N 3/08* (2013.01)

(58) Field of Classification Search
CPC ............ G06N 3/02; G06N 3/04; G06N 3/063; G06N 3/0454; G06N 3/0472; G11C 13/00; G11C 13/0002
See application file for complete search history.

(56) References Cited

U.S. PATENT DOCUMENTS

| 9,111,222 B2 | 8/2015 | Aparin | |
|---|---|---|---|
| 9,396,431 B2 | 7/2016 | Bichler et al. | |
| 2011/0004579 A1* | 1/2011 | Snider | G06N 3/063 706/25 |
| 2011/0119214 A1* | 5/2011 | Breitwisch | G06N 3/0635 706/33 |
| 2012/0317063 A1* | 12/2012 | Sim | G11C 13/0002 706/27 |
| 2013/0073497 A1* | 3/2013 | Akopyan | G06N 3/049 706/27 |
| 2013/0117209 A1* | 5/2013 | Aparin | G11C 11/1673 706/25 |
| 2014/0122402 A1* | 5/2014 | Bichler | G06N 3/04 706/27 |
| 2014/0289179 A1* | 9/2014 | Di Castro | G06G 7/163 706/25 |
| 2015/0170025 A1* | 6/2015 | Wu | G11C 13/0069 706/25 |
| 2016/0247063 A1* | 8/2016 | Brezzo | G06N 3/082 |

(Continued)

OTHER PUBLICATIONS

Mandal, Saptarshi, et al. "Novel synaptic memory device for neuromorphic computing." Scientific reports 4.1 (2014): 1-10. (Year: 2014).*

(Continued)

*Primary Examiner* — Kamran Afshar
*Assistant Examiner* — Randall K. Baldwin

(57) ABSTRACT

A neuromorphic device may include a pre-synaptic neuron, a row line extending from the pre-synaptic neuron in a row direction, a post-synaptic neuron, a column line extending from the post-synaptic neuron in a column direction, and a synapse coupled between the row line and the column line. The synapse may be disposed in an intersection region between the row line and the column line. The post-synaptic neuron may include a subtracting circuit.

14 Claims, 9 Drawing Sheets

(56) References Cited

U.S. PATENT DOCUMENTS

2017/0286827 A1* 10/2017 Chen .................. G06N 3/049
2019/0012597 A1* 1/2019 Van Der Made ........ G06N 3/04

OTHER PUBLICATIONS

Qiao, Ning, et al. "A reconfigurable on-line learning spiking neuromorphic processor comprising 256 neurons and 128K synapses." Frontiers in neuroscience 9 (2015): 141, pp. 1-17 (Year: 2015).*

Indiveri, Giacomo, Federico Corradi, and Ning Qiao. "Neuromorphic architectures for spiking deep neural networks." 2015 IEEE International Electron Devices Meeting (IEDM). IEEE, 2015: 4.2.1-4.2.4 (Year: 2015).*

Indiveri, Giacomo, and Shih-Chii Liu. "Memory and information processing in neuromorphic systems." Proceedings of the IEEE 103.8 (2015): 1379-1397. (Year: 2015).*

Akopyan, Filipp, et al. "Truenorth: Design and tool flow of a 65 mw 1 million neuron programmable neurosynaptic chip." IEEE transactions on computer-aided design of integrated circuits and systems 34.10 (2015): 1537-1557. (Year: 2015).*

Kim, Yongtae, Yong Zhang, and Peng Li. "A reconfigurable digital neuromorphic processor with memristive synaptic crossbar for cognitive computing." ACM Journal on Emerging Technologies in Computing Systems (JETC) 11.4 (2015): 1-25. (Year: 2015).*

Patel, Girish N. A neuromorphic architecture for modeling intersegmental coordination. Georgia Institute of Technology, 1999. (Year : 1999).*

Park, S., et al. "RRAM-based synapse for neuromorphic system with pattern recognition function." 2012 international electron devices meeting. IEEE, 2012. (Year: 2012).*

* cited by examiner

NEUROMORPHIC DEVICE AND A SYNAPSE NETWORK INCLUDING A POST-SYNAPTIC NEURON HAVING A SUBTRACTING CIRCUIT

CROSS-REFERENCE TO RELATED APPLICATIONS

This U.S. non-provisional patent application claims priority under 35 U.S.C. § 119(a) to Korean Patent Application No. 10-2017-0049285, filed on Apr. 17, 2017, in the Korean Intellectual Property Office (KIPO), the disclosure of which is incorporated herein by reference in its entirety.

BACKGROUND

1. Field

The present disclosure relates to a neuromorphic device, and more particularly, to a neuromorphic device including a post-synaptic neuron having a subtracting circuit and a transfer function circuit. The present disclosure also relates to a synapse network of the neuromorphic device including the post-synaptic neuron having the subtracting circuit and the transfer function circuit.

2. Description of the Related Art

Recently, much attention has been paid to devices in the field of neuromorphic technology, which use chips that mimic the human brain. A neuromorphic device based on the neuromorphic technology includes a plurality of pre-synaptic neurons, a plurality of post-synaptic neurons, and a plurality of synapses. The neuromorphic device outputs pulses or spikes having various levels, amplitude, and/or times, according to a learning state of the neuromorphic device.

Generally, variable resistive elements used as synapse cells have asymmetric characteristics. Specifically, changes in the resistance and the conductivity of a variable resistive element when synaptic weights of the synaptic cells increase are not symmetric to changes in the resistance and the conductivity when the synaptic weights decrease. For example, in a resistive memory device such as a resistive random access memory (ReRAM) or a phase changeable memory device such as a phase changeable random access memory (PCRAM), well-known variable resistive elements have resistances that increase linearly and that decrease non-linearly, or have resistances that increase non-linearly and that decrease linearly. That is, well-known variable resistance elements have linear up-resistance change characteristics and non-linear down-resistance change characteristics, or have non-linear up-resistance change characteristics and linear down-resistance change characteristics.

To improve symmetry, a synapse cell having two variable resistive elements has been proposed. In addition, a technique of interpreting the resistance change of the variable resistive elements as positive (+) and negative (−), respectively, has been proposed. However, the previously proposed synapse cell occupies a large area, which lowers the degree of integration of a neuromorphic device including the synapse cell, and requires high voltages and currents for operation, which makes it difficult to downsize the product.

SUMMARY

Embodiments of the present disclosure provide a neuromorphic device including a post-synaptic neuron having a subtracting circuit.

Embodiments of the present disclosure provide a synapse network of a neuromorphic device including a post-synaptic neuron having a subtracting circuit.

Embodiments of the present disclosure provide a neuromorphic device including a synapse having both a positive (+) synapse weight and a negative (−) synapse weight.

Embodiments of the present disclosure provide a synapse network of a neuromorphic device including a synapse having both a positive (+) synapse weight and a negative (−) synapse weight.

Embodiments of the present disclosure provide a neuromorphic device configured to compress data patterns.

Embodiments of the present disclosure provide a synapse network of a neuromorphic device configured to compress data patterns.

The objectives of the present disclosure are not limited to the above-mentioned objectives, and those skilled in the art should recognize that there may be other objectives that are not mentioned above.

In accordance with an embodiment of the present disclosure, a neuromorphic device may include a pre-synaptic neuron, a row line extending from the pre-synaptic neuron in a row direction, a post-synaptic neuron, a column line extending from the post-synaptic neuron in a column direction, and a synapse coupled between the row line and the column line. The synapse may be disposed in an intersection region between the row line and the column line. The post-synaptic neuron may include a subtracting circuit.

The subtracting circuit may include a non-inverting input terminal and an inverting input terminal. The non-inverting input terminal may be electrically connected with the column line and receiving a column current. The inverting input terminal may be electrically connected with a reference current source and receiving a reference current.

The post-synaptic neuron may further include an integrator coupled between the column line and the subtracting circuit.

The post-synaptic neuron may further include a transfer function circuit electrically connected to an output terminal of the subtracting circuit. The transfer function circuit may convert an output current of the subtracting circuit into a signal having a sigmoidal relationship with the output current of the subtracting circuit.

The transfer function circuit may output a neuron current converging to 0 when the output current of the subtracting circuit is negative and increasing.

The transfer function circuit may output a neuron current converging to a maximum value when the output current of the subtracting circuit is positively increasing.

In accordance with an embodiment of the present disclosure, a synapse network of a neuromorphic device. The synapse network may include a first synapse layer, and a second synapse layer. The first synapse layer may include a plurality of first pre-synaptic neurons, a plurality of first row lines extending from the plurality of first pre-synaptic neurons, respectively, a plurality of first post-synaptic neurons, a plurality of first column lines extending from the plurality of first post-synaptic neurons, respectively, and a plurality of first synapses coupled between the plurality of first row lines and the plurality of first column lines, respectively. The plurality of first synapses may be disposed in a plurality of intersection regions between the plurality of first row lines and the plurality of first column lines, respectively. The second synapse layer may include a plurality of second pre-synaptic neurons, a plurality of second row lines extending from the plurality of second pre-synaptic neurons, respectively, a plurality of second post-synaptic neurons, a plurality of second column lines extending from the plurality of second post-synaptic neurons, respectively, and a plurality of second synapses coupled between the plurality of second row lines and the plurality of second column lines, respectively. Each of the plurality of first post-synaptic neurons may include a first subtracting circuit. Each of the plurality of second post-synaptic neurons may include a second subtracting circuit. The plurality of first post-synaptic neurons and the plurality of second pre-synaptic neurons may be electrically connected with each other, respectively.

A number of the plurality of first row lines may be greater than a number of the plurality of first column lines.

A number of the plurality of first column lines may be equal to a number of the plurality of second row lines.

A number of the plurality of second row lines may be greater than a number of the plurality of second column lines.

The first subtracting circuit may include a first non-inverting input terminal and a first inverting input terminal. The first non-inverting input terminal may be electrically connected with one of the plurality of first column lines and receive a first column current from the one of the first column lines. The first inverting input terminal may be electrically connected with a first reference current source and receive a first reference current from the first reference current source. The second subtracting circuit may include a second non-inverting input terminal and a second inverting input terminal. The second non-inverting input terminal may be electrically connected with one of the plurality of second column lines and receive a second column current from the one of the second column lines. The second inverting input terminal may be electrically connected with a second reference current source and receive a second reference current from the second reference current source.

The first reference current may be greater than the second reference current.

The synapse network may further include a third synapse layer. The third synapse layer may include a plurality of third pre-synaptic neurons, a plurality of third row lines extending from the plurality of third pre-synaptic neurons, respectively, a plurality of third post-synaptic neurons, a plurality of third column lines extending from the plurality of third post-synaptic neurons, respectively, and a plurality of third synapses coupled between the plurality of third row lines and the plurality of third column lines, respectively. The plurality of third synapses may be disposed in intersection regions between the plurality of third row lines and the plurality of third column lines, respectively. Each of the plurality of third post-synaptic neurons may include a third subtracting circuit. A number of the plurality of second column lines may be equal to a number of the plurality of third row lines.

The third subtracting circuit may include a third non-inverting input terminal and a third inverting input terminal. The third non-inverting input terminal may be electrically connected with one of the plurality of third column lines and receive a third column current from the one of the third column lines. The third inverting input terminal may be electrically connected with a third reference current source and receive a third reference current from the third reference current source.

Each of the plurality of first post-synaptic neurons may further include a first integrator coupled between one of the plurality of first column lines and the first subtracting circuit. Each of the plurality of second post-synaptic neurons may further include a second integrator coupled between one of the plurality of second column lines and the second subtracting circuit.

In accordance with an embodiment of the present disclosure, a neuromorphic device may include an input device, a first synapse layer, a second synapse layer, and an output device electrically connected in series. The first synapse layer may include a first subtracting circuit, and the second synapse layer may include a second subtracting circuit.

The first subtracting circuit may include a first non-inverting input terminal and a first inverting input terminal.

The first non-inverting input terminal may be electrically connected with a first column line of the first synapse layer.

The first inverting input terminal may be electrically connected with a first reference current source.

The second subtracting circuit may include a second non-inverting input terminal and a second inverting input terminal.

The second non-inverting input terminal may be electrically connected to a second column line of the first synapse layer.

The second inverting input terminal may be electrically connected with a second reference current source.

The first synapse layer may include a first integrator between the first column line and the first non-inverting input terminal.

The second synapse layer may include a second integrator between the second column line and the second non-inverting input terminal.

The first synapse layer may include a first post-synaptic neuron.

The second synapse layer may include a second post-synaptic neuron.

The first subtracting circuit may be included in the first post-synaptic layer.

The second subtracting circuit may be included in the second post-synaptic layer.

DETAILED DESCRIPTION

Figure 1:
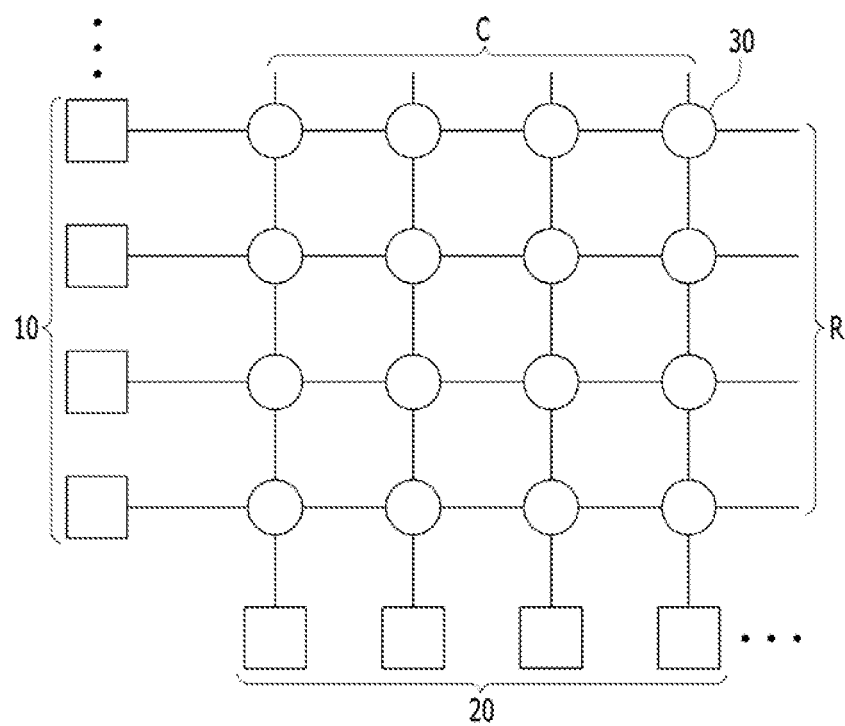
FIG. 1 is a diagram schematically illustrating a synapse array of a neuromorphic device in accordance with an embodiment of the present disclosure.

Various embodiments will be described below in more detail with reference to the accompanying drawings. Embodiments of the present disclosure may, however, have different forms and should not be construed as limited to the embodiments set forth herein. Rather, these embodiments are provided so that this disclosure will be thorough and complete, and will fully convey the scope of the claims to those skilled in the art.

Throughout the specification, like reference numerals refer to the same elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

FIG. 1 is a diagram schematically illustrating a synapse array of a neuromorphic device in accordance with an embodiment of the present disclosure. Referring to FIG. 1, the synapse array of the neuromorphic device in accordance with the present disclosure may include a plurality of pre-synaptic neurons 10, a plurality of post-synaptic neurons 20, and a plurality of synapses 30. Row lines R may extend from the pre-synaptic neurons 10 in a row direction, and column lines C may extend from the post-synaptic neurons 20 in a column direction.

The synapses 30 may be coupled between the row lines R and the column lines C, and may be disposed in intersection regions between the row lines R and the column lines C. That is, the synapses 30 may be disposed in a region between the row lines R and the column lines C, where the row lines R and the column lines C intersect in a direction perpendicular to the row direction and the column direction.

For illustrative purposes, four of the pre-synaptic neurons 10 and four of the post-synaptic neurons 20 are illustrated in FIG. 1.

The pre-synaptic neurons 10 may transmit electrical pulses to the synapses 30 through the row lines R in a learning mode, a reset mode, or a read-out mode. The post-synaptic neurons 20 may transmit electrical pulses to the synapses 30 through the column lines C in the learning mode or the reset mode, and may receive electrical pulses from the synapses 30 through the column lines C in the read-out mode. Each of the synapses 30 may include a 2-terminal device such as a variable resistive device. For example, each of the synapses 30 may include a first electrode, which is electrically connected with one of the pre-synaptic neurons 10, and a second electrode, which is electrically connected with one of the post-synaptic neurons 20.

In an embodiment, each of the synapses 30 may have a variable resistance element, and each of the synapses 30 may have multiple resistance levels. The synapses 30 may be gradually changed from a high resistance state (HRS) to a low resistance state (LRS), or vice versa, in accordance with pulses input from the pre-synaptic neurons 10 and/or the post-synaptic neurons 20. The resistance states of the synapses 30 may be changed due to a number of the input pulses, time differences between the input pulses, and/or voltage differences between the input pulses.

In an embodiment in which the synapses 30 are passive elements, the synapses 30 may output positive current signals based on their current resistance states without being able to output negative current signals based on their current resistance states. That is, each of the synapses 30 may have a positive (+) synapse weight without having a negative (−) synapse weight.

Figure 2A:
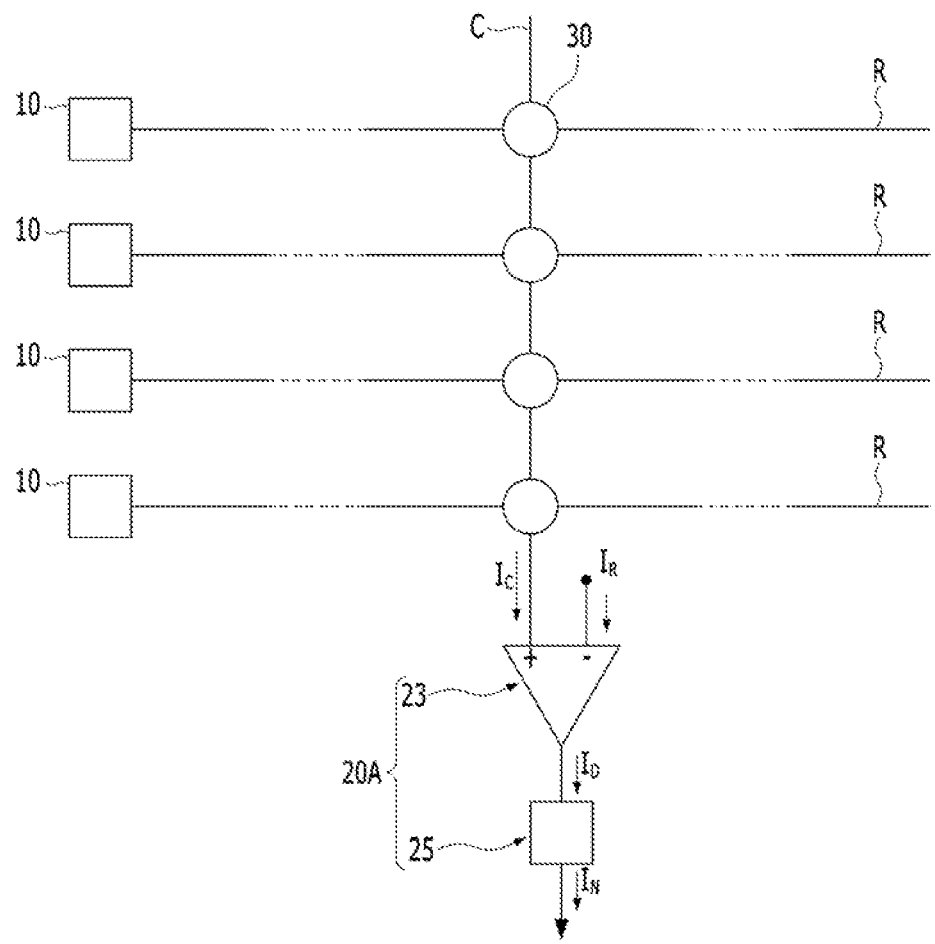
FIG. 2A is a diagram schematically illustrating an inner circuit of a post-synaptic neuron in a synapse array of a neuromorphic device in accordance with an embodiment of the present disclosure.

FIG. 2A is a diagram schematically illustrating an inner circuit of a post-synaptic neuron 20A in a synapse array of a neuromorphic device in accordance with an embodiment of the present disclosure. Referring to FIG. 2A, the post-synaptic neuron 20A may include a subtracting circuit 23 and a transfer function circuit 25.

The subtracting circuit 23 may be electrically connected with a synapse 30 through a column line C. A plurality of synapses 30 on the same column line C may be commonly electrically connected with the same subtracting circuit 23 of the post-synaptic neuron 20A. The plurality of synapses 30 on the same column line C may be electrically connected with a plurality of pre-synaptic neurons 10 through row lines R, respectively.

The subtracting circuit 23 may have a non-inverting input terminal electrically connected with the column line C and an inverting input terminal electrically connected with a reference current source. The non-inverting input terminal may receive a column current $I_C$ of the column signals from the column line C, and the inverting input terminal may receive a reference current $I_R$ from the reference current source. Specifically, the subtracting circuit 23 may output a current difference $I_D$ obtained by subtracting the reference current $I_R$ from the column current $I_C$. For example, when the column current $I_C$ is equal to the reference current $I_R$, the current difference $I_D$ may be substantially 0 A. When the column current $I_C$ is a positive (+) current with a lower magnitude than the reference current $I_R$, the current difference $I_D$ may have a negative (−) current value.

The current difference $I_D$ output by the subtracting circuit 23 may therefore be positive (+) or negative (−) according to the magnitude of the column current $I_C$ of the column signals output from the synapse 30. Accordingly, the synapse 30 in accordance with embodiments of the present disclosure can be analyzed to have both a positive (+) synapse weight and a negative (−) synapse weight; in contrast to a passive-element in the synapse 30 that is a variable resistance element, which cannot have the negative (−) synapse weight.

In an embodiment of the present disclosure, the synapse 30 has only one variable resistive element. Accordingly, the area occupied by the synapse 30 is relatively small, and the power consumption of the synapse 30 is relatively low, so that the neuromorphic device including an array of the synapses 30 can be downsized.

Furthermore, in an embodiment of the present disclosure, because the synapse 30 may be analyzed to have both the positive (+) synapse weight and the negative (−) synapse weight, the synapse 30 can have a wider synapse weight spectrum than a conventional synapse having only the positive (+) synapse weight.

The transfer function circuit 25 may receive the current difference $I_D$ and output a neuron current $I_N$.

Figure 2B:
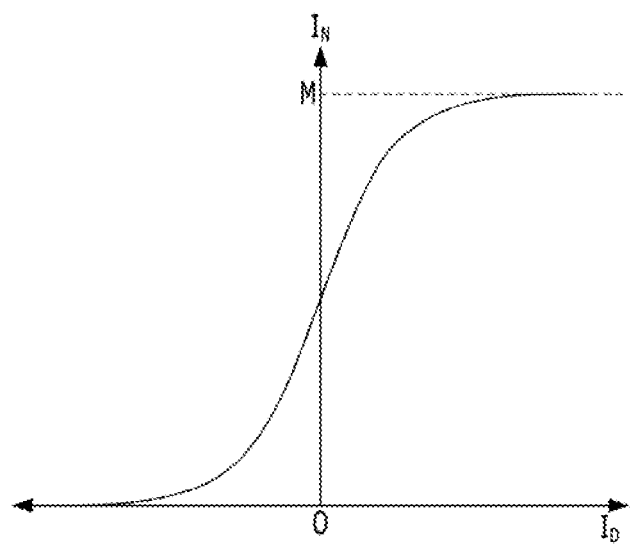
FIG. 2B is a graph schematically illustrating a characteristic curve of a neuron current in accordance with an embodiment of the present disclosure.

FIG. 2B is a graph schematically illustrating a characteristic curve of a neuron current in accordance with an embodiment of the present disclosure. A characteristic curve of the neuron current $I_N$ is shown in FIG. 2B. Referring to FIG. 2B, the transfer function circuit 25 may include a sigmoidal converting circuit. Accordingly, the neuron current $I_N$ output by the transfer function circuit 25 has a sigmoidal relationship with the current difference $I_D$, i.e., the output current of the subtracting circuit 23. For example, the neuron current $I_N$ may converge to 0 A when the current difference $I_D$ is negative (−) and increasing (e.g., negatively increasing), and may converge to a specific (maximum) value M when the current difference $I_D$ is positive (+) and increasing. That is, the current difference $I_D$ may be positive (+) or negative (−), but, the neuron current $I_N$ may be greater than or equal to zero, or positive (+), and may not be negative (−).

Figure 3:
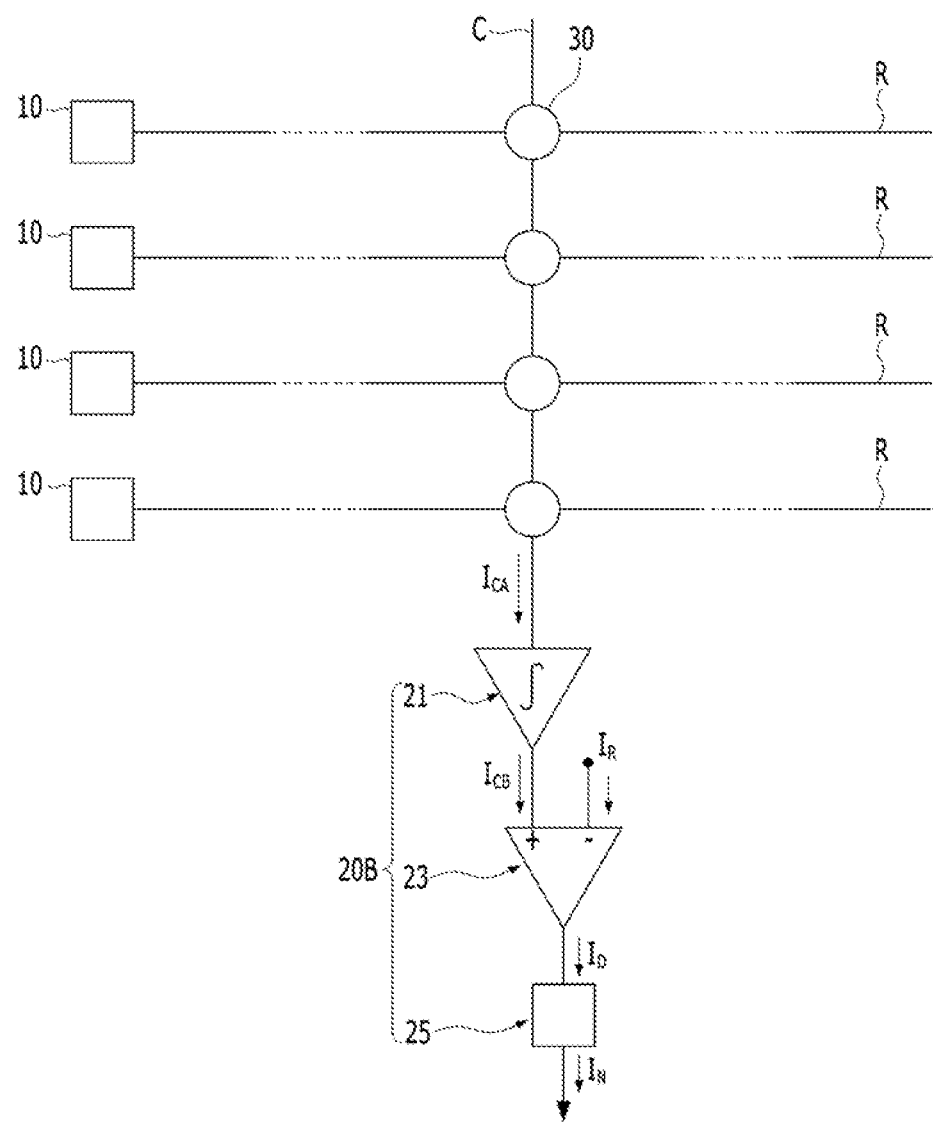
FIG. 3 is a diagram schematically illustrating an inner circuit of a post-synaptic neuron in a synapse array of a neuromorphic device in accordance with an embodiment of the present disclosure.

FIG. 3 is a diagram schematically illustrating an inner circuit of a post-synaptic neuron 20B in a synapse array of a neuromorphic device in accordance with an embodiment of the present disclosure. Referring to FIG. 3, the post-synaptic neuron 20B of the synapse array may include an integrator 21, a subtracting circuit 23, and a transfer function circuit 25.

The integrator 21 may receive and integrate a first column current $I_{CA}$ of the column signals and provide a second column current $I_{CB}$, to the non-inverting input terminal of the subtracting circuit 23. The first column current $I_{CA}$ may represent the synapse weights of the plurality of synapses 30 disposed on the same column line C, and the second column current $I_{CB}$, may represent the synapse weights of the plurality of synapses 30 disposed on the same column line C in an integrated form.

The subtracting circuit 23 may output a current difference $I_D$ to the transfer function circuit 25. The current difference $I_D$ may be obtained by subtracting a reference current $I_R$ from the second column current $I_{CB}$. The transfer function circuit 25 may receive the current difference $I_D$ and output a neuron current $I_N$.

Figure 4:
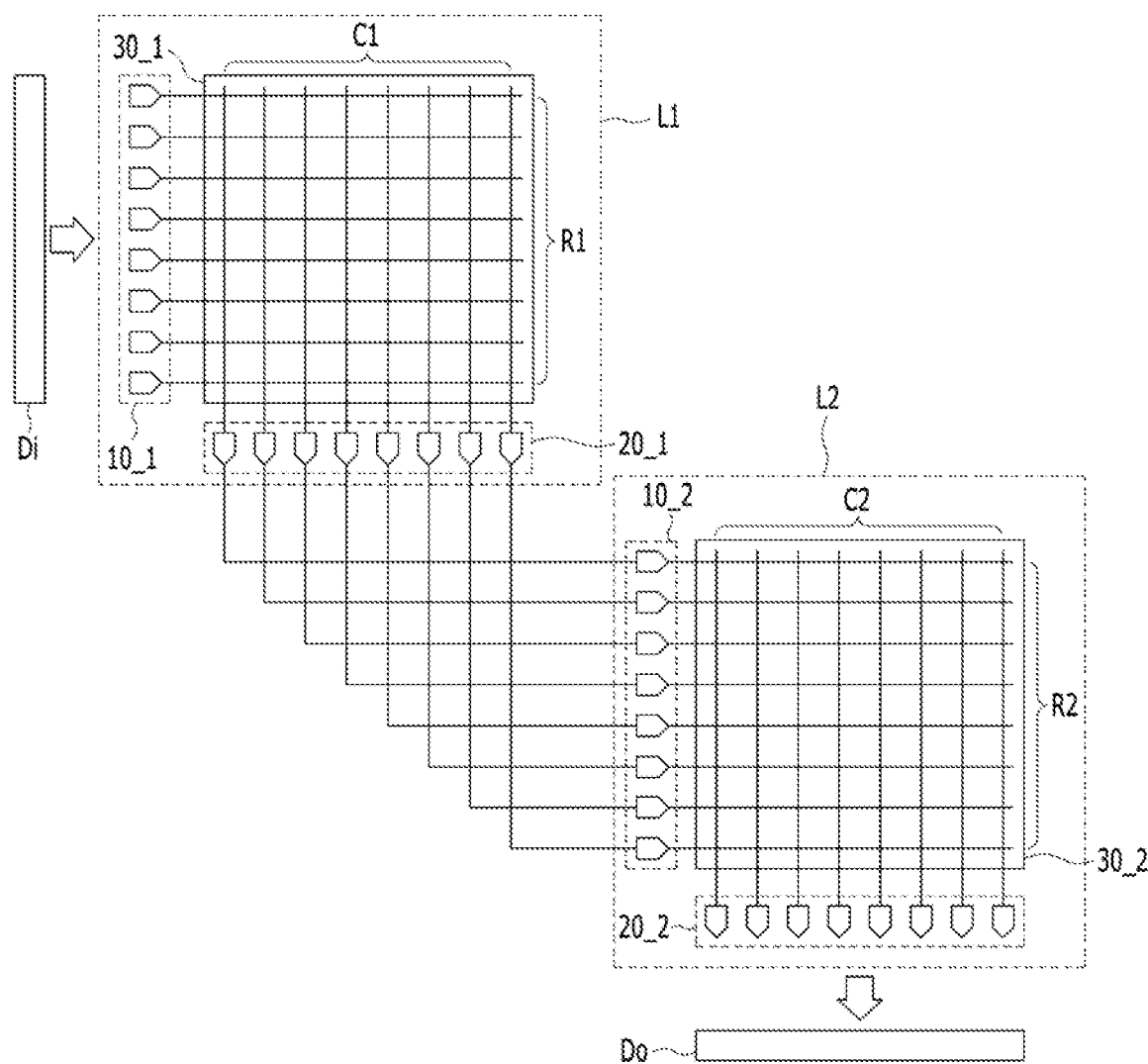
FIG. 4 is a diagram schematically illustrating a synapse network in accordance with an embodiment of the present disclosure.

FIG. 4 is a diagram schematically illustrating a synapse network in accordance with an embodiment of the present disclosure. Referring to FIG. 4, the synapse network may include an input device Di, an output device Do, and a plurality of synapse layers between the input device Di and the output device Do. The plurality of synapse layers includes a first synapse layer L1 and a second synapse layer L2.

The input device Di may include at least one of an image sensor, a scanner, a keyboard, a mouse, a touch panel, a touch pen, a microphone, a sound receiver, a sampler, and other various recognition elements. In another embodiment, the input device Di may include a pre-processor. The pre-processor may extract initial data patterns from input data and provide the extracted initial data patterns to the first synapse layer L1.

The output device Do may include at least one of a display monitor, a tablet PC, a printer, a speaker, a projector, and other various display elements.

The first synapse layer L1 and the second synapse layer L2 may include first and second pluralities of pre-synaptic neurons 10_1 and 10_2, first and second pluralities of post-synaptic neurons 20_1 and 20_2, and first and second synapse arrays 30_1 and 30_2, respectively.

The initial data patterns provided from the input device Di may be converted into first pre-synaptic neuron signals by the first pre-synaptic neurons 10_1. The first pre-synaptic neuron signals may be input to the first synapse array 30_1 through first row lines R1, and may train first synapses of the first synapse array 30_1. The initial data patterns may be stored in the first synapses of the first synapse array 30_1 in the form of first data patterns.

The first data patterns may be converted into first column signals by the first synapses of the first synapse array 30_1 and provided to the first post-synaptic neurons 20_1 through first column lines C1. The first column signals may be converted into first current differences by the first post-synaptic neurons 20_1. The first current differences may be used to output first post-synaptic neuron signals, which have a sigmoidal relationship with respect to the first column signals. The first current differences may have positive (+) values or negative (−) values.

The first post-synaptic neuron signals may be provided to the second synapse layer L2. Specifically, each of the first post-synaptic neurons 20_1 may provide one of the first post-synaptic neuron signals to a corresponding one of the second pre-synaptic neurons 10_2 of the second synapse layer L2.

The second pre-synaptic neurons 10_2 may convert the first post-synaptic neuron signals into second pre-synaptic neuron signals and provide the second pre-synaptic neuron signals to the second synapse array 30_2 through second row lines R2. The second pre-synaptic neuron signals may train second synapses of the second synapse array 30_2. The first data patterns may be stored in the second synapses of the second synapse array 30_2 in the form of second data patterns.

The second data patterns may be converted into second column signals by the second synapses of the second synapse array 30_2 and provided to the second post-synaptic neurons 20_2 through the second column lines C2. The second column signals may be converted into second current differences by the second post-synaptic neurons 20_2. The second current differences may be used to output second post-synaptic neuron signals, which have a sigmoidal relationship with respect to the second data patterns. The second current differences may have positive (+) values or negative (−) values.

The second post-synaptic neuron signals may be provided to the output device Do. The output device Do may convert the second post-synaptic neuron signals into visual or auditory patterns, and may output the visual or auditory patterns.

In an embodiment, each of the first post-synaptic neurons 20_1, as well as each of the second post-synaptic neurons 20_2, may include the integrator 21, the subtracting circuit 23, and the transfer function circuit 25 illustrated in FIG. 2A or FIG. 3.

Figure 5:
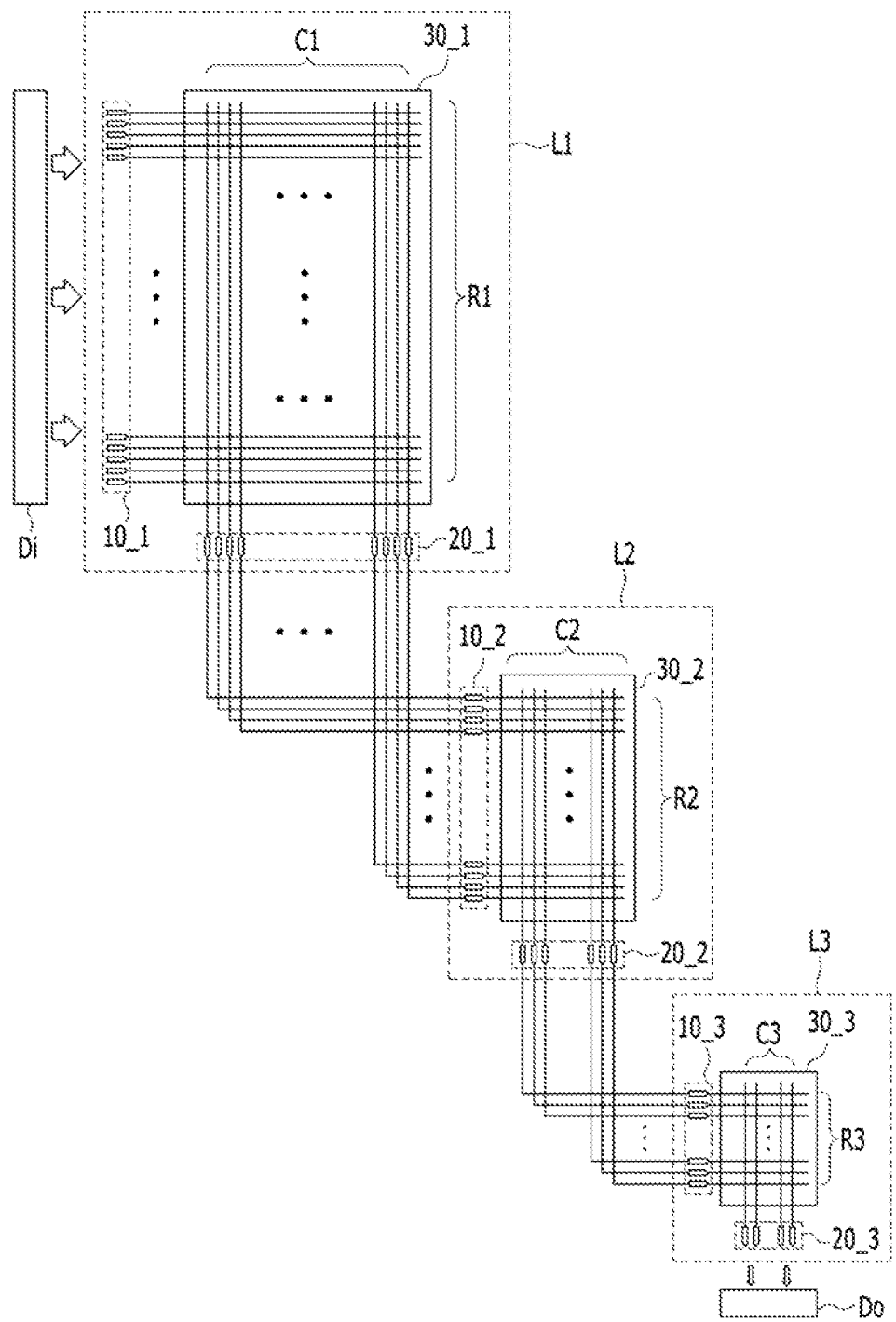
FIG. 5 is a diagram schematically illustrating a synapse network in accordance with an embodiment of the present disclosure.

FIG. 5 is a diagram schematically illustrating a synapse network in accordance with an embodiment of the present disclosure. Referring to FIG. 5, the synapse network may include an input device Di, first to third synapse layers L1 to L3, and an output device Do. For example, the synapse network in accordance with the embodiment of the present disclosure may compress data patterns.

The first synapse layer L1 may include first row lines R1 and first column lines C1. A total number of the first column lines C1 may be less than a total number of the first row lines R1. That is, there may be fewer first column lines C1 than first row lines R1. The second synapse layer L2 may include second row lines R2 and second column lines C2. A total number of the second lines C2 may be less than a total number of the second row lines R2. The total number of the first column lines C1 may be equal to the total number of the second row lines R2. The third synapse layer L3 may include third row lines R3 and third column lines C3. A total number of the third column lines C3 may be less than a total number of the third row lines R3. The total number of the second column lines C2 may be equal to the total number of the third row lines R3.

First data patterns stored in first synapses of the first synapse array 30_1 may be compressed and stored in second synapses of the second synapse array 30_2 in the form of second data patterns. The second data patterns may include the compressed first data patterns, such that the first data patterns may be derived from the second data patterns. The second data patterns may be compressed and stored in third synapses of the third synapse array 30_3 in the form of third data patterns. The third data patterns may include the compressed second data patterns, such that the second data patterns may be derived from the third data patterns.

For example, initial data patterns may train the first synapses and be stored in the first synapses in the form of the first data patterns.

Similarly, electrical signals of the first data patterns output through the first column lines C1 may train the second synapses and be stored in the second synapses, which are on the second column lines C2 of the second synapse layer L2, in the form of the second data patterns, respectively. That is, the first data patterns may be compressed into the second data patterns.

Furthermore, electrical signals of the second data patterns output through the second column lines C2 may similarly train the third synapses and be stored in the third synapses, which are on the third column lines C3 of the third synapse layer L3, in the form of the third data patterns, respectively. That is, the second data patterns may be compressed into the third data patterns.

The third data patterns may be output to the output device Do through the third column lines C3. That is, the third data patterns may be output to the output device Do as output data patterns.

In an embodiment, if the total number of the first row lines R1 is NR1, the total number of the first column lines C1 is NC1, the total number of the second row lines R2 is NR2, the total number of the second column lines C2 is NC2, the total number of the third row lines R3 is NR3, and the total number of the third column lines C3 is NC3, then NR1>NC1=NR2>NC2=NR3>NC3. Accordingly, the data patterns stored in NR1 synapses may be compressed into data patterns stored in NC3 synapses, where NC3<NC1.

The total number of the first row lines R1 may be equal to a total number of electrical signals in the initial data patterns input from the input device Di. The total number of the third column lines C3 may be equal to a total number of electrical signals in the output data patterns received by the output device Do. When the data patterns input to the input device Di are image patterns, a total number of electrical signals in the image patterns, which may be divided into a plurality of pixels, may be equal to the total number of the first row lines R1. For example, in an embodiment of the present disclosure, the first synapse layer L1 may have 784 of the first row lines R1 and 250 of the first column lines C1, the second synapse layer L2 may have 250 of the second row lines R2 and 125 of the second column lines C2, and the third synapse layer L3 may have 125 of the third row lines R3 and 10 of third column lines C3. That is, the number of second row lines R2 may be equal to the number of first column lines C1, and the number of third row lines R3 may be equal to the number of second column lines C2. In some embodiments of the present disclosure, the numbers of each plurality of row lines R1 to R3 and the numbers of each plurality of column lines C1 to C3 may be variously set.

Figure 6A:
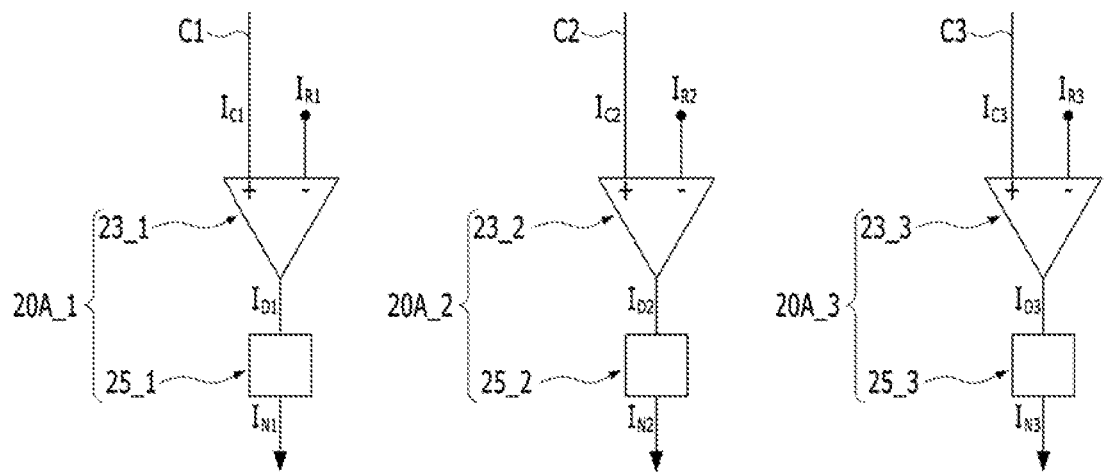
FIG. 6A is a diagram schematically illustrating inner circuits of post-synaptic neurons in accordance with an embodiment of the present disclosure.
Figure 6B:
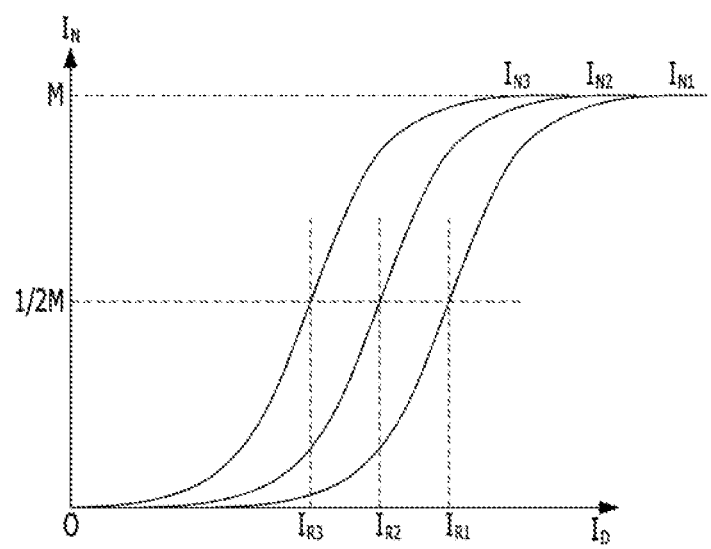
FIG. 6B is a graph schematically illustrating current differences and neuron currents with respect to reference currents in accordance with an embodiment of the present disclosure.

FIG. 6A is a diagram schematically illustrating inner circuits of post-synaptic neurons 20A_1 to 20A_3 in accordance with an embodiment of the present disclosure. FIG. 6B is a graph schematically illustrating current differences $I_{D1}$ to $I_{D3}$ and neuron currents $I_{N1}$ to $I_{N3}$ with respect to reference currents $I_{R1}$ to $I_{R3}$ shown in FIG. 6A. The post-synaptic neurons 20A_1 to 20A_3 shown in FIG. 6A may be utilized by the first to third synapse layers L1 to L3, respectively, shown in FIG. 5.

Referring to FIG. 6A, a first post-synaptic neuron 20A_1 may include a first subtracting circuit 23_1 and a first transfer function circuit 25_1, a second post-synaptic neuron 20A_2 may include a second subtracting circuit 23_2 and a second transfer function circuit 25_2, and a third post-synaptic neuron 20A_3 may include a third subtracting circuit 23_3 and a third transfer function circuit 25_3. A first reference current $I_{R1}$ utilized by the first subtracting circuit 23_1 may be greater than a second reference current $I_{R2}$ utilized by the second subtracting circuit 23_2, and the second reference current $I_{R2}$ utilized by the second subtracting circuit 23_2 may be greater than a third reference current $I_{R3}$ utilized by the third subtracting circuit 23_3. For example, as the numbers of the respective pluralities of row lines R1 to R3 increase, absolute values of the respective reference currents $I_{R1}$ to $I_{R3}$ may also increase. In an embodiment, a number of the first row lines R1 is greater than a number of the second row lines R2, which is greater than a number of the third row lines R3. Accordingly, the first reference current $I_{R1}$ may be greater than the second reference current $I_{R2}$, which may be greater than the third reference current $I_{R3}$, such that $I_{R1} > I_{R2} > I_{R3}$.

Referring to FIGS. 6A and 6B, in a synapse network of a neuromorphic device in accordance with the present disclosure, the subtracting circuits 23_1 to 23_3 may output the various current differences $I_{D1}$ to $I_{D3}$ in accordance with the reference currents $I_{R1}$ to $I_{R3}$. As the numbers of the respective pluralities of row lines R1 to R3 and/or the numbers of the respective pluralities of synapses commonly connected with the respective pluralities of column lines C1 to C3 increase, a total sum of column currents $I_{C1}$ to $I_{C3}$ becomes larger. Thus, the reference currents $I_{R1}$ to $I_{R3}$ can have various values that are proportional to the total sum of the column currents $I_{C1}$ to $I_{C3}$. When the reference currents $I_{R1}$ to $I_{R3}$ are each about ½ of a maximum value (M) of each of the column currents $I_{C1}$ to $I_{C3}$, respectively, the current differences $I_{D1}$ to $I_{D3}$ may be symmetric. That is, each synapse may be potentiated and depressed at the same signal level or similar signal levels.

Figure 7:
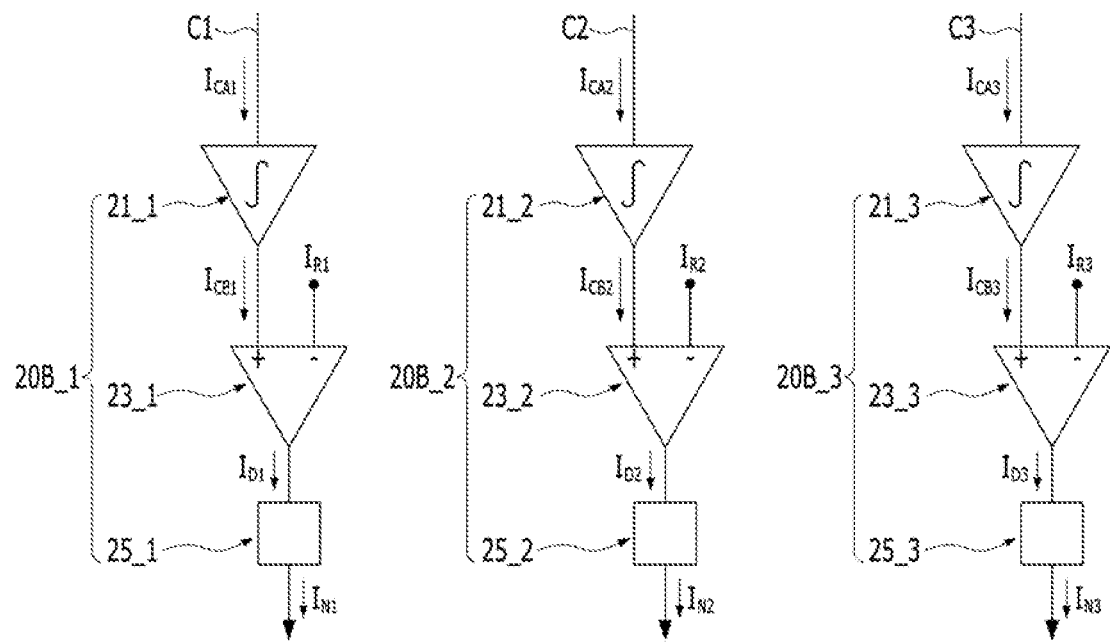
FIG. 7 is a diagram schematically illustrating inner circuits of post-synaptic neurons in accordance with an embodiment of the present disclosure.

FIG. 7 is a diagram schematically illustrating inner circuits of post-synaptic neurons 20B_1 to 20B_3 in accordance with an embodiment of the present disclosure. Referring to FIG. 7, a first post-synaptic neuron 20B_1 may include a first integrator 21_1, a first subtracting circuit 23_1, and a first function circuit 25_1; a second post-synaptic neuron 20B_2 may include a second integrator 21_2, a second subtracting circuit 23_2, and a second function circuit 25_2; and a third post-synaptic neuron 20B_3 may include a third integrator 21_3, a third subtracting circuit 23_3, and a third function circuit 25_3.

The first integrator 21_1 may integrate a first column current $I_{CA1}$ of a first column signal from a first column line C1, which corresponds to first synapse weights, into a first integrated current $I_{CB1}$, and may provide the first integrated current $I_{CB1}$ to a non-inverting terminal of the first subtracting circuit 23_1. The second integrator 21_2 may integrate a second column current $I_{CA2}$ of a second column signal from a second column line C2, which corresponds to second synapse weights, into a second integrated current $I_{CB2}$, and may provide the second integrated current $I_{CB2}$ to a non-inverting terminal of the second subtracting circuit 23_2. The third integrator 21_3 may integrate a third column current $I_{CA3}$ from a third column line C3, which corresponds to third synapse weights, into a third integrated current $I_{CB3}$, and may provide the third integrated current $I_{CB3}$ to a non-inverting terminal of the third subtracting circuit 23_3. A first reference current $I_{R1}$ of the first subtracting circuit 23_1 may be greater than a second reference current $I_{R2}$ of the second subtracting circuit 23_2, and the second reference current $I_{R2}$ of the second subtracting circuit 23_2 may be greater than a third reference current $I_{R3}$ of the third subtracting circuit 23_3.

Figure 8:
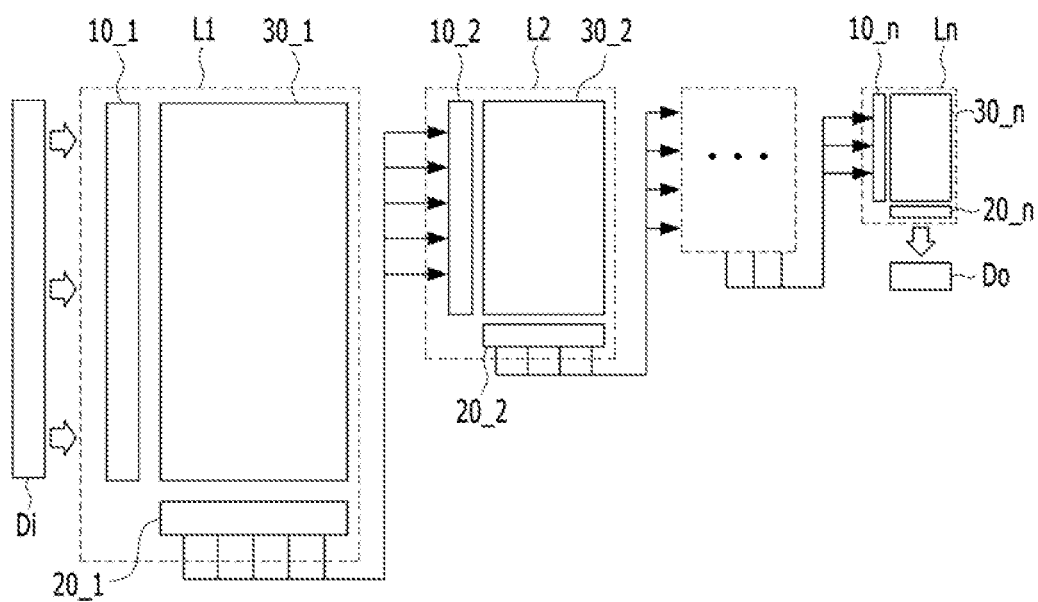
FIG. 8 is a diagram schematically illustrating a synapse network of a neuromorphic device having multi-layered synapse layers in accordance with an embodiment of the present disclosure.

FIG. 8 is a diagram schematically illustrating a synapse network of a neuromorphic device having multi-layered synapse layers L1 to Ln in accordance with an embodiment of the present disclosure.

Referring FIG. 8, the synapse network may include an input device Di, a plurality of synapse layers L1 to Ln, and an output device Do. For example, the synapse network can compress data patterns. The input device Di and a plurality of pre-synaptic neurons 10_1 of the first synapse layer L1 may be electrically connected with each other. Each plurality of post-synaptic neurons 20_1 to 20_n–1 of the respective synapse layers L1 to Ln–1 may be electrically connected with each plurality of pre-synaptic neurons 10_2 to 10_n of the next synapse layers L2 to Ln. The last plurality of post-synaptic neurons 20_n of the last synapse layer Ln may be electrically connected with the output device Do. The numbers of pluralities of column lines C1 to Cn–1 of the synapse layers L1 to Ln–1 may be equal to the numbers of pluralities of row lines R2 to Rn of the next synapse layers L2 to Ln, respectively. The numbers of the pluralities of row lines R1 to Rn of all the synapse layers L1 to Ln may be greater than the numbers of the pluralities of column lines C1 to Cn, respectively. Accordingly, the data patterns input from the input device Di may be compressed and output to the output device Do.

Figure 9:
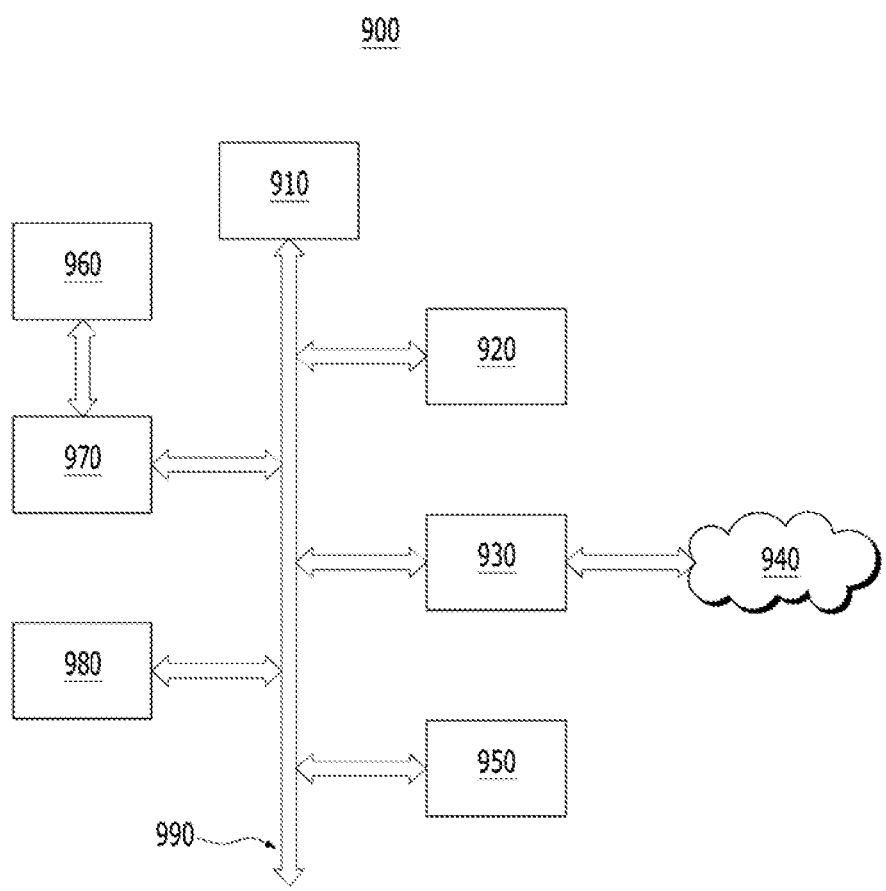
FIG. 9 is a diagram schematically illustrating a pattern recognition system in accordance with an embodiment of the present disclosure.

FIG. 9 is a diagram schematically illustrating a pattern recognition system 900 in accordance with an embodiment of the present disclosure. For example, the pattern recognition system 900 may include any of a speech recognition system, an imaging recognition system, a code recognition system, a signal recognition system, and one or more systems for recognizing various patterns.

Referring to FIG. 9, the pattern recognition system 900 in accordance with the embodiment of the present disclosure may include a Central Processing Unit (CPU) 910, a memory unit 920, a communication control unit 930, a network 940, an output unit 950, an input unit 960, an Analog-Digital Converter (ADC) 970, a neuromorphic unit 980, and a bus 990. The CPU 910 may generate and transmit various signals for a learning process of the neuromorphic unit 980, and perform various processes and functions for recognizing patterns according to an output from the neuromorphic unit 980. For example, the CPU 910 may perform processes and functions for recognizing speech and imaging patterns based on the output from the neuromorphic unit 980.

The CPU 910 may be connected with the memory unit 920, the communication control unit 930, the output unit 950, the ADC 970, and the neuromorphic unit 980 through the bus 990.

The memory unit 920 may store various pieces of information, which are required to be stored in the pattern recognition system 900. The memory unit 920 may include one or more of a volatile memory device, such as DRAM or SRAM, a nonvolatile memory, such as PRAM, MRAM, ReRAM or NAND flash memory, and various memory units, such as a Hard Disk Drive (HDD) and a Solid State Drive (SSD).

The communication control unit 930 may transmit and/or receive data to and/or from a communication control unit of another system through the network 940. For example, the communication control unit 930 may transmit speech and/or image recognition data through the network 940.

The output unit 950 may output data in various manners. For example, the output unit 950 may include one or more of a speaker, a printer, a monitor, a display panel, a beam projector, a hologrammer, and another output device. The output unit 950 may output, for example, speech and/or image recognition data.

The input unit 960 may include one or more of a microphone, a camera, a scanner, a touch pad, a keyboard, a mouse, a mouse pen, and a sensor.

The ADC 970 may convert analog data inputted from the input unit 960 into digital data.

The neuromorphic unit 980 may perform learning or recognition using the data outputted from the ADC 970, and output data corresponding to recognized patterns. The neuromorphic unit 980 may include one or more of the neuromorphic devices in accordance with the various embodiments described above.

In accordance with the present disclosure, as both the positive (+) synapse weight and the negative (–) synapse weight can be realized by only one synapse cell. Thus, the neuromorphic device can be further integrated and minimized.

In accordance with the present disclosure, since the compression synapse network can be realized by adjusting the reference current values, the neuromorphic device can be simplified and miniaturized, and the cost of the product can be lowered.

Although various embodiments have been described for illustrative purposes, it will be apparent to those skilled in the art that various changes and modifications may be made without departing from the spirit and scope of the disclosure, as defined in the following claims.

What is claimed is:

1. A neuromorphic device comprising:
  a pre-synaptic neuron;
  a row line extending from the pre-synaptic neuron in a row direction;
  a post-synaptic neuron;
  a column line extending from the post-synaptic neuron in a column direction; and
  a synapse coupled between the row line and the column line, the synapse being disposed in an intersection region between the row line and the column line,
  wherein:
  the post-synaptic neuron comprises a subtracting circuit,
  the pre-synaptic neuron provides electrical pulses to the synapse through the row line,
  the post-synaptic neuron receives a column current from the synapse through the column line,
  the subtracting circuit comprises a non-inverting input terminal and an inverting input terminal, the non-inverting input terminal being electrically connected with the column line and receiving the column current, the inverting input terminal being electrically connected with a reference current source and receiving a reference current, and the subtracting circuit outputs a current difference between the column current and the reference current.

2. The neuromorphic device of claim 1, wherein the post-synaptic neuron further comprises an integrator coupled between the column line and the non-inverting input terminal of the subtracting circuit, and
wherein the integrator provides a sum of column currents to the non-inverting input terminal of the subtracting circuit.

3. The neuromorphic device of claim 1, wherein the post-synaptic neuron further comprises a transfer function circuit electrically connected to an output terminal of the subtracting circuit, and
wherein the transfer function circuit converts an output current of the subtracting circuit into a signal having a sigmoidal relationship with the output current of the subtracting circuit.

4. The neuromorphic device of claim 3, wherein the transfer function circuit outputs a neuron current converging to 0 when the output current of the subtracting circuit is negatively increasing.

5. The neuromorphic device of claim 3, wherein the transfer function circuit outputs a neuron current converging to a maximum value when the output current of the subtracting circuit is positively increasing.

6. A synapse network of a neuromorphic device, the synapse network comprising:
a first synapse layer; and
a second synapse layer,
wherein the first synapse layer comprises:
a plurality of first pre-synaptic neurons;
a plurality of first row lines extending from the plurality of first pre-synaptic neurons, respectively;
a plurality of first post-synaptic neurons;
a plurality of first column lines extending from the plurality of first post-synaptic neurons, respectively; and
a plurality of first synapses coupled between the plurality of first row lines and the plurality of first column lines, respectively, the plurality of first synapses being disposed in a plurality of intersection regions between the plurality of first row lines and the plurality of first column lines, respectively, and
wherein the second synapse layer comprises:
a plurality of second pre-synaptic neurons;
a plurality of second row lines extending from the plurality of second pre-synaptic neurons, respectively;
a plurality of second post-synaptic neurons;
a plurality of second column lines extending from the plurality of second post-synaptic neurons, respectively; and
a plurality of second synapses coupled between the plurality of second row lines and the plurality of second column lines, respectively,
wherein:
each of the plurality of first post-synaptic neurons comprises a first subtracting circuit,
each of the plurality of second post-synaptic neurons comprises a second subtracting circuit,
the plurality of first post-synaptic neurons and the plurality of second pre-synaptic neurons are electrically connected with each other, respectively,
the first pre-synaptic neuron provides first electrical pulses to the first synapse through the first row line,
the first post-synaptic neuron receives a first column current from the first synapse through the first column line,
the second pre-synaptic neuron provides second electrical pulses obtained from the first column current to the second synapse through the second row line,
the second post-synaptic neuron receives a second column current from the second synapse through the second column line,
a number of the plurality of first row lines is greater than a number of the plurality of first column lines,
a number of the plurality of first column lines is equal to a number of the plurality of second row lines, and
a number of the plurality of second row lines is greater than a number of the plurality of second column lines.

7. The synapse network of the neuromorphic device of claim 6,
wherein the first subtracting circuit comprises a first non-inverting input terminal and a first inverting input terminal, the first non-inverting input terminal being electrically connected with one of the plurality of first column lines and receiving a first column current from the one of the first column lines, the first inverting input terminal being electrically connected with a first reference current source and receiving a first reference current from the first reference current source, and
wherein the second subtracting circuit comprises a second non-inverting input terminal and a second inverting input terminal, the second non-inverting input terminal being electrically connected with one of the plurality of second column lines and receiving a second column current from the one of the second column lines, the second inverting input terminal being electrically connected with a second reference current source and receiving a second reference current from the second reference current source.

8. The synapse network of the neuromorphic device of claim 7, wherein the first reference current is greater than the second reference current.

9. The synapse network of the neuromorphic device of claim 6, the synapse network further comprising a third synapse layer,
wherein the third synapse layer comprises:
a plurality of third pre-synaptic neurons;
a plurality of third row lines extending from the plurality of third pre-synaptic neurons, respectively;
a plurality of third post-synaptic neurons;
a plurality of third column lines extending from the plurality of third post-synaptic neurons, respectively; and
a plurality of third synapses coupled between the plurality of third row lines and the plurality of third column lines, respectively, the plurality of third synapses being disposed in intersection regions between the plurality of third row lines and the plurality of third column lines, respectively,
wherein each of the plurality of third post-synaptic neurons comprises a third subtracting circuit, and
wherein a number of the plurality of second column lines is equal to a number of the plurality of third row lines.

10. The synapse network of the neuromorphic device of claim 9, wherein the third subtracting circuit comprises a third non-inverting input terminal and a third inverting input terminal, the third non-inverting input terminal being electrically connected with one of the plurality of third column lines and receiving a third column current from the one of the third column lines, the third inverting input terminal being electrically connected with a third reference current source and receiving a third reference current from the third reference current source.

11. The synapse network of the neuromorphic device of claim 6, wherein each of the plurality of first post-synaptic neurons further comprises a first integrator coupled between one of the plurality of first column lines and the first subtracting circuit, and wherein each of the plurality of second post-synaptic neurons further comprises a second integrator coupled between one of the plurality of second column lines and the second subtracting circuit.

12. A neuromorphic device comprising:
a plurality of pre-synaptic neurons;
a plurality of row lines extending from the pre-synaptic neurons in a row direction;
a plurality of post-synaptic neurons;
a plurality of column lines extending from the post-synaptic neurons in a column direction; and
a plurality of synapses coupled between the row lines and the column lines,
wherein each of the post-synaptic neurons comprises a subtracting circuit,
wherein the subtracting circuit includes a non-inverting input terminal connected to one of the column lines, an inverting input terminal connected to a reference current source, and an output terminal to output a current difference between a column current received from each of the synapses and a reference current provided from the reference current source.

13. The neuromorphic device of claim 12,
wherein each of the post-synaptic neurons further comprises an integrator between the one of the column lines and the subtracting circuit,
wherein the column current includes a first column current provided from each of the synapses through the one of the column lines and a second column current integrated in the integrator, and
wherein the current difference is obtained by subtracting the reference current from the second column current.

14. The neuromorphic device of claim 12, wherein a number of the pre-synaptic neurons is greater than a number of the post-synapse neurons.

* * * * *